United States Patent [19]

Kobayashi

[11] 4,304,069
[45] Dec. 8, 1981

[54] SLOPE PROTECTION METHOD FOR PLANTING

[75] Inventor: Tsuguo Kobayashi, Yachiyo, Japan

[73] Assignee: Nittoku Kensetsu Kabushiki Kaisha, Tokyo, Japan

[21] Appl. No.: 131,698

[22] Filed: Mar. 19, 1980

Related U.S. Application Data

[63] Continuation of Ser. No. 889,440, Mar. 23, 1978, abandoned.

[51] Int. Cl.³ .............................................. A01C 21/00
[52] U.S. Cl. ................................................ 47/58; 47/9
[58] Field of Search ............................ 111/1, 10–13; 47/9, 58, DIG. 10; 405/36

[56] References Cited

U.S. PATENT DOCUMENTS

| 2,632,979 | 3/1953 | Alexander | 47/9 |
|---|---|---|---|
| 2,945,322 | 7/1960 | Gaeth et al. | 47/9 |
| 2,974,030 | 3/1961 | Geary | 47/9 X |
| 3,061,975 | 11/1962 | Hibshman et al. | 47/9 |
| 3,125,294 | 3/1964 | Lill | 47/9 X |
| 3,938,279 | 2/1976 | Fonne | 47/9 |

FOREIGN PATENT DOCUMENTS

| 2204201 | 5/1974 | France | 47/9 |
|---|---|---|---|
| 44-17963 | 8/1969 | Japan | 111/1 |
| 49-70405 | 7/1974 | Japan | 47/9 |
| 52-38710 | 3/1977 | Japan | 47/9 |
| 270601 | 5/1971 | U.S.S.R. | 111/1 |

OTHER PUBLICATIONS (Author Unknown) (Sales or Advertising Bulletin) *Fiber–Soil Greening Process* by Nittoku Kensetsu Kabushiki Ltd.

(Author Unknown) *Listing of Construction Projects* by Nittoku Kensetsu Kabushiki Ltd.

*Primary Examiner*—James R. Feyrer
*Attorney, Agent, or Firm*—Robert E. Burns; Emmanuel J. Lobato; Bruce L. Adams

[57] ABSTRACT

Soil including a setting agent such as fiber-soil-cement or the like is sprayed onto a slope so that corrugations extending substantially in parallel to the horizon are formed. Grooves and ridges of the corrugated surface provide conditions for allowing plants to grow on the protected slope.

2 Claims, 2 Drawing Figures

SLOPE PROTECTION METHOD FOR PLANTING

This is a continuation of application Ser. No. 889,440, filed Nov. 23, 1978 and now abandoned.

BACKGROND OF THE INVENTION

1. Field of the Invention

This invention relates to a slope protection method for planting, and more particularly to a method of construction of a plant bed, which not only mechanically stabilizes a slope such as a cut slope or talus that has been left as it is without any means of treatment in the past, but also allows easy growth of plants.

2. Description of the Prior Art

Essentially, the quality of soil found on a slope which is formed by methods commonly adopted in the field of civil engineering is unsuitable to grow plants. And even when plants are introduced and planted, it is likely that the surface of the natural ground or soil itself fails because of weathering, washing-away, sliding, etc. before the plants begin to grow. Among slope protection methods applied in the past to this type of slope are; the masonry method, the block method, the concrete framing method, the block framing method, the shot-creting method, the mortar spraying method, etc. These protection methods, however, produce difficult conditions for initially introduced plants to grow.

For the growth of plants, soil must be stable, and those factors such as light, temperature, air content, water retention, content of nutriments, etc. must be suitable ones.

SUMMARY OF THE INVENTION

Accordingly, the chief object of the present invention is to provide an improved method for protecting slopes to allow easy planting.

With the above object in view, the slope protection method for planting according to the present invention comprises the steps of preparing soil containing a setting agent such as fiber-soil-cement with or without plant seeds and spraying the soil onto a slope surface so that the sprayed soil forms corrugations extending substantially parallel to the horizon. The soil may be fiber-soil-cement which is a mixture of cement and sand with a predetermined amount of vegetable or organic fibers such as peat moss. If desired, the fiber-soil-cement may include plant seeds. The spraying may be achieved by mannually moving a spraying nozzle directed toward the slope surface along a plurality of lines spaced from each other by a predetermined distance and substantially parallel to the horizon.

BRIEF DESCRIPTION OF THE DRAWING

The present invention will become more readily apparent from the following description of the preferred embodiment of the present invention taken in conjunction with the accompanying drawing, in which.

DESCRIPTION OF THE PREFERRED EMBODIMENT

Mortar spraying and shot-creting, which have been practiced in the past as slope protection methods, are techniques with the object of stabilizing a slope by preventing weathering, and have been applied to slopes with no stress in the natural ground. One of the principal characteristics of the spraying method is that it can provide a complete bond between the natural ground and the sprayed mortar. This invention utilizes this characteristic of the spraying method. That is, this invention includes a method of spraying fiber-soil-cement, a mixture of cement and sand with vegetable fibers or organic fibers such as peat moss or like material added, on to a slope, and is characterized by spraying the material in such a manner as to form steps with a wavy profile.

Figure 1:
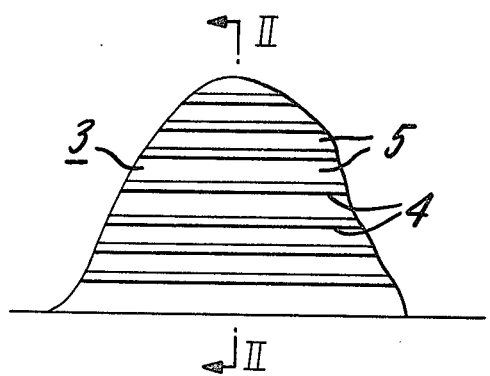
FIG. 1 is a view illustrating a slope protected by the method of the present invention.
Figure 2:
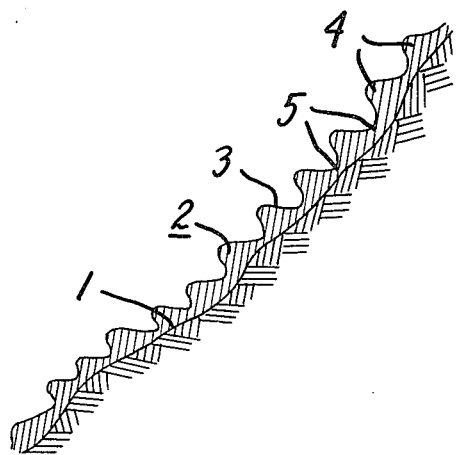
FIG. 2 is a sectional view taken along the line II—II in FIG. 1.

FIGS. 1 and 2 of the accompanying drawing illustrate a slope to which the method of the present invention has been applied. The slope of a cut or a bank has a sloped surface 1 of rock or earth. The surface 1 is covered with a layer of soil 2 containing a setting agent such as cement which is sprayed by a well-known suitable sprayer in such a manner that the sprayed surface 3 forms corrugations extending substantially along lines parallel to the horizon. The corrugated surface 3 has a plurality of ridges 4 and grooves 5 formed by repeatedly moving the mannually movable spray nozzle of the sprayer directed toward the slope surface 1 along a plurality of traverse lines spaced from each other by a predetermined distance and extending substantially parallel to the horizon. A pitch of the ridges 4 of from about 25 cm to about 30 cm is advantageous, but a greater pitch may also be used if desired. The depth of the ridges 4 may be from about 4 cm to about 6 cm. The mean thickness of the sprayed layer 2 may advantageously be about 7 cm.

The soil containing the setting agent may be fiber-soil-cement which provides a satisfactory bed to grow plants as well as protection of the slope surface 1. The fiber-soil-cement is a mixture of sand or sandy soil as the main ingredient, cement as the setting agent and a fiber admixture as basic materials for the growth of plants. The fiber-soil-cement may or may not include seeds of grass, weeds or trees selected in accordance with the objectives of planting.

A suitable composition of the fiber-soil-cement is given below:

sand or sandy soil: 1,000–2,000 kg/m$^3$
admixture: 100–200 kg/m$^3$
cement: 10–35 kg/m$^3$
seeds: 3–3.5 kg/m$^3$ Compared with flat application of spray (with uniform thickness), stepped application of spray with the corrugated surface increases the area of the exposed surface, which leads to an increased expected capacity to retain water, and thus, can provide better condition as to air content and exposure to light. Also it facilitates the sprouting of various seeds and the extrusion of native plants, and is quite effective in providing progressive planting.

As to the water which is indispensable for plants to grow, the increased area and the undulation of the surface of the plant bed, when compared with a conventional flat surface, provide easier retention of water from rainfall, thus solving the problem of retaining rainwater on a slope.

As to the growth of grass and weeds on the slope surface, it has been observed that there exists a tendency towardly less growth of roots and a thinner layer of roots as the slope becomes steeper. However, this stepped application of spray with a wave-shaped profile, which may be regarded as a kind of contour farming, facilitates the growth and propagation of plants.

As to the intrusion of native plants, the undulation on the plant bed naturally facilitates the retention of seeds which land on it, resulting in the settlement of a very high percentage of them on the slope. This further serves well for permanent planting through botanical transitions.

Also the effect of the stepped form with a wave-shaped profile is apparent in preventing erosion due to rainwater. That is, the rainwater filtering into the slope is lead from thin portions to thick portions, and thus, the speed of the surface flow is moderated by the undulation. Therefore, this is advantageous from the viewpoint of erosion and failure control.

Though not illustrated in FIG. 1 and FIG. 2, the method of the present invention makes it possible to plant young plants in places and apply the method of the invention to the rest of the slope.

What is claimed is:

1. A method for protecting a soilless slope having substantially no soil thereon while allowing planting and plant growth thereon, comprising the steps of:
   preparing sprayable soil including a setting agent and having a consistency high enough to prevent sagging and running of the soil sprayed onto the slope; and
   spraying said sprayable soil onto the entire surface of the slope to be protected and forming a corrugated surface of the sprayed soil thereover with the corrugations of said corrugated surface extending substantially parallel to the horizon, and with said corrugated surface having a plurality of ridges spaced at a pitch of from about 25 cm to about 30 cm, the height of said ridges being from about 4 cm to about 6 cm, and the mean thickness of the sprayed soil being about 7 cm.

2. A method as claimed in claim 1, wherein said sprayable soil includes plant seeds.

* * * * *